Aug. 21, 1945. H. CREWDSON 2,383,240
CENTRIFUGING MACHINE
Filed March 3, 1942 2 Sheets-Sheet 1
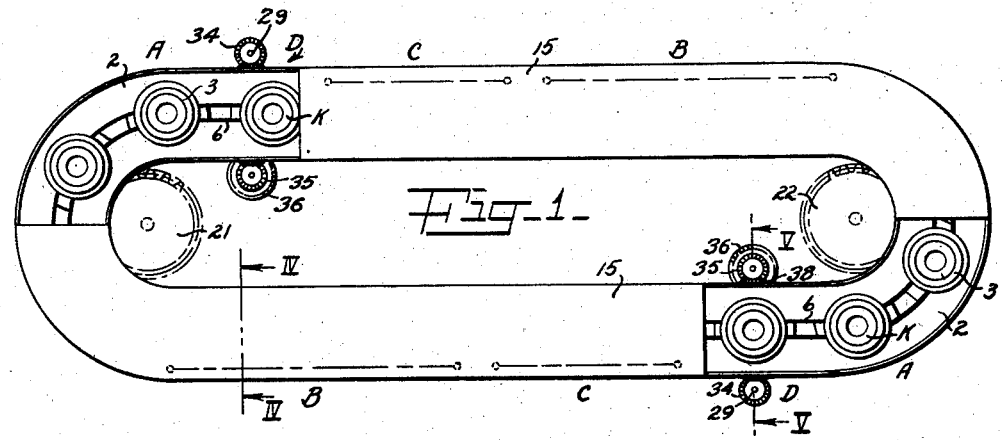
Fig-1-
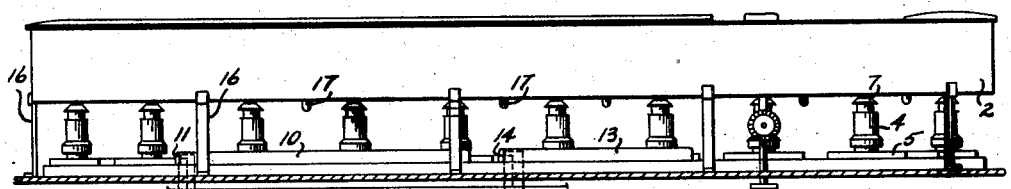
Fig-2-
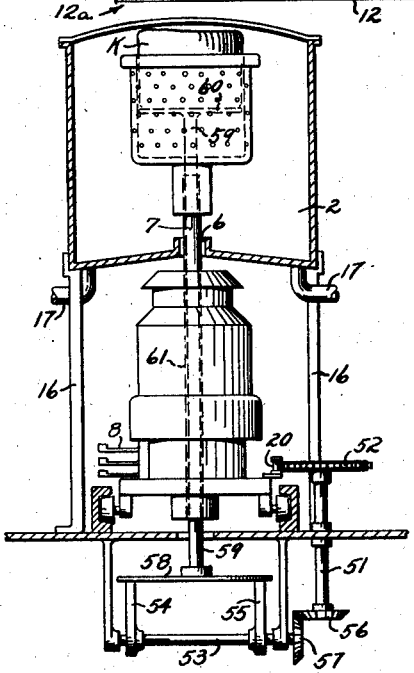
Fig-7-
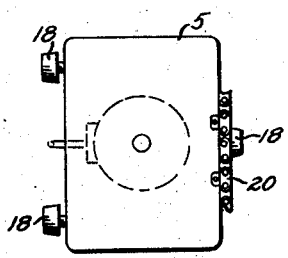
Fig-3-
INVENTOR.
HENRY CREWDSON
BY Thomas R. O'Malley
ATTORNEY Aug. 21, 1945.   H. CREWDSON   2,383,240
CENTRIFUGING MACHINE
Filed March 3, 1942   2 Sheets-Sheet 2
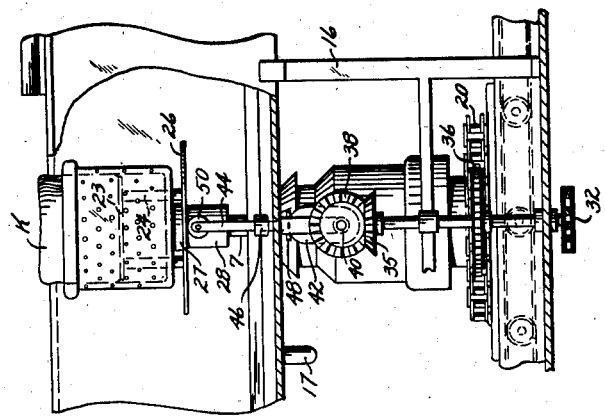
INVENTOR.
HENRY CREWDSON
BY
ATTORNEY.

Patented Aug. 21, 1945

2,383,240

UNITED STATES PATENT OFFICE 2,383,240

CENTRIFUGING MACHINE

Henry Crewdson, Chester County, Pa., assignor to American Viscose Corporation, Wilmington, Del., a corporation of Delaware Application March 3, 1942, Serial No. 433,155

7 Claims. (Cl. 210—71)

This invention relates to a device for removing liquids from wet processed cakes of rayon or other filamentary material, whether natural or artificial.

It is an object of the invention to provide a device for conveying the cakes being operated upon in a continuous circuit past a loading and unloading station with means for centrifuging them in a portion of the circuit and with means for slowing the centrifuge motors to a stop by reversal of electric current supplied thereto. It is also an object to provide a centrifuging device of this type with a means for automatically ejecting the cake at least partially from the centrifuge pot after substantial reduction of speed of the centrifuge as it approaches the loading and unloading station. Other objects of the invention will appear from the drawings and the description thereof.

In the drawings, illustrative of the invention,

Figure 1 shows a plan view of the device,

Figure 2 shows an elevational view of the device,

Figure 3 is a plan view of one of the conveyor platforms,

Figure 4 is a transverse elevation with parts in cross-section looking in the direction of the lines IV—IV of Figure 1, Figure 5 is a similar transverse elevation with parts in cross-section looking in the direction of lines V—V of Figure 1, Figure 6 is a side elevation of the portion of the device shown in Figure 5 with parts cut away, Figure 7 is a transverse elevation corresponding to that of Figure 5 of a modification of the cake ejector.

In general, the device comprises a trough 2 in the form of a loop through which a series of centrifuging buckets 3 (the walls of which may be perforated in conventional manner) may be continuously drawn past a loading and unloading station A, a centrifuging station B, and the centrifuge stopping station C. These several stations are adjacent to one another so that the buckets pass through them in succession. A given machine may contain a single one of each of the said stations or it may comprise a plurality of such sequential stations, as shown in Figure 1 in which two such sequential treatment stages constitute the machine. An operator may be placed at each of the stations A to unload and to reload the buckets with cakes K as they pass. As each bucket approaches the unloading station A, a suitable mechanism provided at a station D adjacent thereto automatically ejects the cake from the bucket, at least partially, to facilitate removal of the cake by hand or otherwise at the unloading station A.

Each of the buckets 3 is provided with an individual motor 4 which is mounted upon a suitable platform 5 which serves as a conveyor for both the motor and the bucket. The trough 2 is provided with a central slot 6 running longitudinally thereof so that the spindle 7 connecting the bucket with the motor may be moved through the trough without interference therefrom. Each individual motor is provided with electrical contact members 8 which may consist of arms carrying brush or roller contact elements which are adapted to make contact with bus bars 9 provided along the length of the trough through station B in order to drive the bucket while it passes through that station. These bus bars 9 are suitably protected within a casing shown generally at 10 in Figure 2 and are suitably connected electrically by the terminals 11 shown diagrammatically in Figure 2 to a source of electrical power 12, which as shown is a three-phase type, at the junction 12a. The device is provided with additional bus bars in housing 13 along station C. These latter bus bars are not connected with those at station B, and are connected by suitable terminals 14 to the three-phase power supply 12 in a manner shown diagrammatically at 12b in Figure 2 such that the current within the motor opposes its motion acquired along station B, thereby reducing its speed to effectively stop it. The length of the bus bars at station C are correlated to the speed of the buckets past them so as to bring the buckets to a substantially complete stop. This action is generally termed "plugging" and may be so referred to hereinafter. If desired, other means for reducing the speed of the centrifugal bucket may be provided along station C, one example being a braking means.

The trough may be covered, though preferably not at the stations where it is desired to load and unload the bucket. Preferably the covers 15 are removable, and they may be hinged to the trough in any suitable fashion. Suitable supports 16 are provided on either side of the trough at spaced points therealong and drain pipes 17 may be connected to the lowermost portions of the trough bottom, and these pipes may be connected to a drain header or headers.

Referring more particularly to Figures 3 and 4, the conveyor platform 5 may be provided with wheels 18 which are adapted to ride within suitable oppositely disposed rails 19 which serve to guide the conveyor with its motor and bucket through the circuit in the trough. Preferably, three wheels are disposed upon the platform as shown in Figure 3 to facilitate the making of any curves within the apparatus. A chain 20 which runs the length of the machine is fastened to the upper surface of the platform at one edge and is adapted to be driven by the sprockets 21 and 22 shown in Figure 1.

Each bucket is provided with an ejector plate 23 in the shape of a disk or annulus which is slidable axially within the bucket. In the modification shown in Figure 4, this annulus or disk is fastened to a plurality, three being shown, of rods 24 extending through suitable apertures 25 within the base of the bucket and have their lower ends fastened to an annular plate 26 beneath the bucket. This annular plate may be provided with an inner sleeve 27 which is adapted to slide about the hub 28 of the bucket. This ejector means is carried along with each bucket and comes into play for ejecting the plate 23 from the bucket at station D.

The operation of the ejector means is shown in Figures 5 and 6. Two vertical shafts 29 and 30 provided with a positive driving interconnection, such as by the two sprockets 31 and 32 and the driving chain 33 at their lower ends, are provided with bevel gears 34 and 35 at their upper ends and one (30) of such shafts is provided with a driving sprocket 36 which is in mesh with the chain 20 by which it is driven. Two bevel gears 37 and 38 driven by the bevel gears 34 and 35 respectively on the vertical shafts 29 and 30 transmit motion through suitable supported horizontal shafts 39 and 40 to the quick-rise cams 41 and 42 mounted thereon. Two vertical rods 43 and 44 extending through suitable bearing surfaces 45 and 46 provided in the bottom of the trough are provided with follower plates 47 and 48 for operative engagement with the two cams 41 and 42 which impart vertical reciprocatory motion to the rods. These rods 43 and 44 may be provided with rollers 49 and 50 at their upper end which engage the annular plate 26 beneath the bucket and effect ejection of the cake from the bucket upon rise thereof. The cams 41 and 42 are so shaped and the driving mechanism therefor is so related to the shape thereof that no vertical motion of the rods 43 and 44 is effected until after the annular plate 26 comes into position over the bearing rollers 49 and 50.

The extent of ejection of the cake from the bucket may be any proportion desired, this being controlled by the selection of the cams 41 and 42. As the bucket passes beyond the ejector means, the ejector plate 23 descends into its normal position in the bottom of the bucket while the cake, because of its tendency to grip the wall of the bucket after centrifuging, remains substantially at the position to which it has been raised by the ejector plate. In this manner, an operator may readily insert his hand within the cake to the bottom thereof or to any extent desired and obtain a firm grip thereupon in a manner which will not distort the cake or tend to remove the wrapping, which may be of the cylindrical stocking type of textile wrapping, extending about both the interior and exterior of the cake from the interior of the cake.

A modification of the ejector mechanism is shown in Figure 7. In this figure, a vertical shaft 51 is provided with the take-off sprocket 52 in mesh with the chain 20. A horizontal shaft 53 carrying the cams 54 and 55 may be driven by the vertical shaft 51 by means of the bevel gears 56 and 57. The cams 54 and 55 cooperate with the circular lifting plate 58 connected by the vertical rod 59 to the ejector plate 60 within the bucket. The bucket is provided with a hollow driving shaft 61 which extends through the entire motor so that this rod may reciprocate vertically within the hollow shaft.

While preferred embodiments of the invention have been shown, it is to be understood that changes and variations may be made without departing from the spirit and scope of the invention as defined by the appended claims.

What I claim is:

1. In apparatus for treating filamentary material, a plurality of centrifugal buckets, axially movable means in said buckets comprising a platform for supporting filamentary material, a plurality of motors, spindles concentric with the movable means and connecting the motors directly with the buckets for driving said buckets, means for continuously moving said motors and buckets in a predetermined path, means for operating said motors during a portion of said motion, and cam means at a different portion of said path arranged to axially move said movable means to at least partially eject said filamentary material from said buckets when they pass said portion.

2. In apparatus for treating filamentary material, a plurality of centrifugal buckets, axially movable means in said buckets comprising a platform for supporting filamentary material, a plurality of motors, spindles concentric with the movable means and connecting the motors directly with the buckets for driving said buckets, means for continuously moving said motors and buckets in a predetermined path, means for operating said motors during a portion of said motion, means for reducing the speed of said motors to bring the buckets to a substantially complete stop during a second portion of said motion, and cam means along a third portion of said path arranged to axially move said movable means to at least partially eject said filamentary material from said buckets when they pass said portion.

3. In apparatus for treating filamentary material, a plurality of centrifugal buckets, axially movable means in each of said buckets comprising a platform for supporting filamentary material, said means being provided with a vertically reciprocable operating member outside said bucket, a plurality of motors, spindles concentric with the corresponding operating members and connecting the motors directly with the buckets for driving said buckets, means for continuously moving said motors and buckets in a predetermined path, means for operating said motors during a portion of said motion, means for reducing the speed of said motors to bring the buckets to a substantially complete stop during a second portion of said motion, and cam means along a third portion of said path for elevating said operating member when it passes said portion.

4. In apparatus for treating filamentary material, a plurality of centrifugal buckets, axially movable means in each of said buckets comprising a platform for supporting filamentary material, said means being provided with a vertically reciprocable operating member outside said bucket, a plurality of motors, spindles concentric with the corresponding operating members and connecting the motors directly with the buckets for driving said buckets, means for continuously moving said motors and buckets in a predetermined path, means for operating said motors during a portion of said motion, and cam means along a different portion of said path arranged to elevate said operating member when it passes said portion.

5. In apparatus for treating filamentary material, a plurality of centrifugal buckets, axially movable means in each of said buckets for supporting filamentary material, said means being provided with a vertically reciprocable operating member outside said bucket, a plurality of motors for driving said centrifugal buckets, means for continuously moving said motors and buckets in a predetermined path, electrical contact members on each of said motors, bus bars extending along a portion of said path, a second set of bus bars extending along a second portion of said path, a common power supply, said two sets of bus bars being connected thereto, said second set of bus bars being connected to the common power supply in such a manner with respect to said first set as to oppose the motion of said motors resulting from connection with the first set, and means along a third portion of said path for elevating said operating member when it passes said portion.

6. In apparatus for treating filamentary material, a plurality of centrifugal buckets, axially movable means in each of said buckets comprising a platform for supporting filamentary material, said means being provided with a vertically reciprocable operating member outside said buckets, a plurality of motors, spindles concentric with the corresponding operating members and connecting the motors directly with the buckets for driving said buckets, means for continuously moving said motors and buckets in a pre-determined path, means for operating said motors during a portion of said motion, rotatable cam means along a different portion of said path arranged to elevate said operating member when it passes said portion, means for rotating said cam means, and driving means for said cam rotating means.

7. In apparatus for treating filamentary material, a plurality of centrifugal buckets, axially movable means in each of said buckets for supporting filamentary material, said means being provided with a vertically reciprocable operating member outside said bucket, a plurality of motors for driving said buckets, means for continuously moving said motors and buckets in a pre-determined path, means for operating said motors during a portion of said motion, rotatable cam means along a different portion of said path for elevating said operating member when it passes said portion, and means for rotating said cam means, said cam rotating means having driving connections with said means for continuously moving said motors in a predetermined path.

HENRY CREWDSON.